US007917508B1

(12) United States Patent  (10) Patent No.: US 7,917,508 B1
Baluja et al.  (45) Date of Patent: Mar. 29, 2011

(54) IMAGE REPOSITORY FOR HUMAN INTERACTION PROOFS

(75) Inventors: Shumeet Baluja, Santa Clara, CA (US); Richard Carl Gossweiler, III, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 612 days.

(21) Appl. No.: 11/849,084

(22) Filed: Aug. 31, 2007

(51) Int. Cl.
*G06F 17/30* (2006.01)
(52) U.S. Cl. ........................................ 707/736; 707/754
(58) Field of Classification Search .................. 707/100, 707/736–740
See application file for complete search history.

(56) References Cited

U.S. PATENT DOCUMENTS

| 6,195,698 | B1 | 2/2001 | Lillibridge et al. | 709/225 |
| 6,366,683 | B1* | 4/2002 | Langlotz | 382/128 |
| 7,747,614 | B2* | 6/2010 | Freeman et al. | 707/722 |
| 2001/0003182 | A1* | 6/2001 | Labelle | 707/3 |
| 2003/0195883 | A1* | 10/2003 | Mojsilovic et al. | 707/6 |
| 2004/0199597 | A1 | 10/2004 | Libbey et al. | 709/207 |
| 2005/0246321 | A1* | 11/2005 | Mahadevan et al. | 707/3 |
| 2007/0009178 | A1* | 1/2007 | Kim et al. | 382/276 |
| 2007/0026372 | A1* | 2/2007 | Huelsbergen | 434/322 |

OTHER PUBLICATIONS

Baluja, S., et al., "Large Scale Performance Measurement of Content-Based Automated Image-Orientation Detection," IEEE Conference on Image Processing, vol. 2, Sep. 11-14, 2005.
Brill, E., "A Simple Rule-Based Part of Speech Tagger," Proceedings of the $3^{rd}$ Conf. on Applied Computational Linguistics (ACL), Trento, Italy, 1992, pp. 112-116.
Capili, R., "Verify All Humans!," Webmonkey/programming/, http://www.webmonkey.com//templates/print_template, 9 pgs., Nov. 23, 2005.
Chellapilla, K., et al. "Computers Beat Humans at Single Character Recognition in Reading Based Human Interaction Proofs (HIPS)," in Proceedings of the $3^{rd}$ Conf. on Email and Anti-Spam, Jul. 2005.
Chen, Y., et al., "Content-Based Image Retrievel by Clustering," MIR '03, Berkeley, California, Nov. 7, 2003.
Dai, Y., et al., "Image Clustering Using Semantic Tolerance Relation Model," Processings of the IASTED European Conf. Internet and Multimedia Systems and Applications, Chamonix, France, Mar. 14-16, 2007, pp. 278-283.
Goldberger, J., et al., "Unsupervised Image Clustering Using the Information Bottleneck Method," Pattern Recognition: $24^{th}$ DAGM Symposium, Zurich, Switzerland, Sep. 16-18, 2002.
Greenspan, H., et al., "Probabilistic Models for Generating, Modelling and Matching Image Categories," Proceedings of the Int'l Conf. on Pattern Recognition, Quebec, Aug. 2002.
Jing, Y., et al., "Canonical Image Selection from the Web," CIVR '07, Amsterdam, the Netherlands, Jul. 9-11, 2007.

(Continued)

*Primary Examiner* — Tim T. Vo
*Assistant Examiner* — Gary Koo
(74) *Attorney, Agent, or Firm* — Morgan, Lewis & Bockius LLP (57) ABSTRACT

A method of populating an image repository is disclosed. The method includes identifying a keyword from a dictionary and querying an image source using the keyword, thereby yielding a set of images associated with the keyword. The method also includes performing a second query on the image source using a combination of the keyword and one or more additional terms, thereby yielding a plurality of images associated with the combination. Then the plurality of images associated with the combination is subtracted from the set of images associated with the keyword, thereby yielding a difference set of images which are added to the image repository if the difference set of images satisfies predefined criteria.

22 Claims, 6 Drawing Sheets

OTHER PUBLICATIONS

Kesmodel, D., "Codes on Sites 'Captcha' Anger of Web Users," The Wall Street Journal Online, http://www.online.wsj.com/public/article, 3 pgs., May 31, 2006.

Koshman, S., et al., "Web Searching on the Vivisimo Search Engine," J. of the American Society of Information Science and Technology, vol. 57, No. 14, Oct. 2, 2006, pp. 1875-1887.

Lim, J., et al. "Image Clustering with Metric, Local Linear Structure and Affine Symmetry," Lecture Notes in Computer Science, Computer Vision—ECCV 2004.

Lopresti, D., "Leveraging the CAPTCHA Problem," $2^{nd}$ Int'l Workshop on Human Interactive Proofs, Bethlehem, PA, May 2005.

Lopresti, D., "Leveraging the CAPTCHA Problem," Computer Science & Engineering, Lehigh Univ.

Mori, G., et al., "Recognizing Objects in Adversarial Clutter: Breaking a Visual CAPTCHA," in Proceedings of Computer Vision and Pattern Recognition, 2003.

Moy, G., et al., "Distortion Estimation Techniques in Solving Visual CAPTCHAs," IEEE Conference on Computer Vision and Pattern Recognition, vol. 2, Issue 27, Jul. 2004.

Rowley, H.A., et al., "Neural Network-Based Face Detection," IEEE Transactions on Pattern Analysis and Machine Intelligence, vol. 20, No. 1, Jan. 1998.

Rui, Y., et al., "Characters and Faces: A User Study on Ease of Use for HIPs," Lecture Notes in Computer Science, Springer Berlin, 2005.

Swets, D.L., et al., "Hierarchical Discriminant Analysis for Image Retrieval," IEEE Transactions on Pattern Analysis and Machine Intelligence, vol. 21, Issue 5, May 1999, pp. 386-401.

Vailaya, A., et al., "Automatic Image Orientation Detection," IEEE Transactions on Image Processing, vol. 11, No. 7, Jul. 2002.

Viola, P., et al., "Rapid Object Detection Using a Boosted Cascade of Simple Features," in Proceedings of Computer Vision and Pattern Recognition, pp. 511-518, 2001.

Von Ahn, L., et al., "Telling Humans and Computers Apart Automatically," Communications on the ACM, vol. 47, No. 2, Feb. 2004.

Von Ahn, L., et al., "CAPTCHA: Using Hard AI Problems for Security," in EUROCRYPT, 2003.

Wu, V., et al., "TextFinder: An Automatic System to Detect and Recognize Text in Images," Computer Science Dept., Univ. of Massachusetts, Jun. 10, 1999.

Wu, V., et al. "Finding Text in Images," Proceedings of the $2^{nd}$ ACM Int'l Conf. on Digital Libraries, 1997.

Zeng, H-J., et al., "Learning to Cluster Web Search Results," SIGIR '04, Sheffield, South Yorkshire, UK, Jul. 25-29, 2004.

Zhang, L., et al., "Boosting Image Orientation Detection with Indoor vs. Outdoor Classification," IEEE Workshop on Applications of Computer Vision, Orlando, Florida, Dec. 3-4, 2002.

"CAPTCHA: Telling Humans and Computers Apart Automatically," Carnegie Mellon University, http://www.captcha.net, 2000.

\* cited by examiner

FIG. 1

Please log in below.

Username: user123
Password: **********

206
208

Please select in the menu the word that best
describes what is shown in the pictures below
and hit the Submit button.

| Image 1 | Image 2 | Image 3 |
| 210-1 | 210-2 | 210-3 |

| Image 4 | Image 5 | Image 6 |
| 210-4 | 210-5 | 210-6 |

210

202 car ▼
baby
car
cat
dog
egg
house
...

Submit

FIG. 2A

Please log in below.

Username: user123 — 206
Password: ********** — 208

Please type in the text box on the right the word that best describes what is shown in the pictures below and hit the Submit button.

| Image 1 210-1 | Image 2 210-2 | Image 3 210-3 |
| Image 4 210-4 | Image 5 210-5 | Image 6 210-6 |

210 car — 204

Submit

IMAGE REPOSITORY FOR HUMAN INTERACTION PROOFS

RELATED APPLICATIONS

This application is related to U.S. patent application Ser. No. 11/502,993, filed Aug. 10, 2006, entitled "Verifying Human Interaction via Rotated Images," which is hereby incorporated by reference in its entirety.

TECHNICAL FIELD

The disclosed embodiments relate generally to online security, and more particularly, to methods and systems for building a repository of images for human interaction proofs.

BACKGROUND

Many services on the Internet, such as email, online polls, weblogs, and message boards, are provided free of charge to users. However, these services are particularly vulnerable to abuse because they are free of charge. The abuse often involves malicious users deploying automated scripts or software agents known as bots to use the services in order to send spam, engage in ballot stuffing, and so forth.

Human interaction proofs have been deployed to combat such abuse. Human interaction proofs are used to verify that the user is a human being before granting the user access. An example of a human interaction proof is PIX. PIX involves presenting to the user multiple images of an object and asking the user for a word that identifies the object shown in the images. The images used in PIX may be drawn from an image database or image repository. If the image database is too small, PIX may be subject to attack by memorization. However, gathering and labeling images for an image database can be a time consuming task.

Accordingly, there is a need for a more efficient manner of building a large image repository.

SUMMARY

A method of populating an image repository is disclosed. The method includes identifying a keyword from a dictionary and querying an image source using the keyword, thereby yielding a set of images associated with the keyword. The method also includes performing a second query on the image source using a combination of the keyword and additional terms, thereby yielding images associated with the combination. Then the images associated with the combination are subtracted from the set of images associated with the keyword, thereby yielding a difference set of images which are added to the image repository if the difference set of images satisfies predefined criteria.

A system for populating an image repository is also disclosed. The system includes means for identifying a keyword from a dictionary and means for performing a first query on an image source, the query comprising the keyword, thereby yielding a set of images associated with the keyword. The system also includes means for performing a second query on the image source using a combination of the keyword and additional terms, thereby yielding images associated with the combination. The system includes means for subtracting the images associated with the combination from the set of images associated with the keyword to yield a difference set of images; and means for adding the difference set of images to the image repository if the difference set of images satisfies predefined criteria.

BRIEF DESCRIPTION OF THE DRAWINGS

Like reference numerals refer to corresponding parts or method steps throughout the drawings.

DESCRIPTION OF EMBODIMENTS

Methods, systems, computer programs, and other aspects of the invention are described. Reference will be made to certain embodiments of the invention, examples of which are illustrated in the accompanying drawings. While the invention will be described in conjunction with the embodiments, it is not intended to limit the invention to these particular embodiments. On the contrary, the invention is intended to cover alternatives, modifications and equivalents that are within the spirit and scope of the invention. The specification and drawings are, accordingly, to be regarded in an illustrative rather than a restrictive sense.

Moreover, in the following description, numerous specific details are set forth to provide a thorough understanding of the present invention. However, it will be apparent to one of ordinary skill in the art that the invention may be practiced without these particular details. In other instances, methods, procedures, components, and networks well known to those of ordinary skill in the art are not described in detail to avoid obscuring aspects of the present invention.

Figure 1:
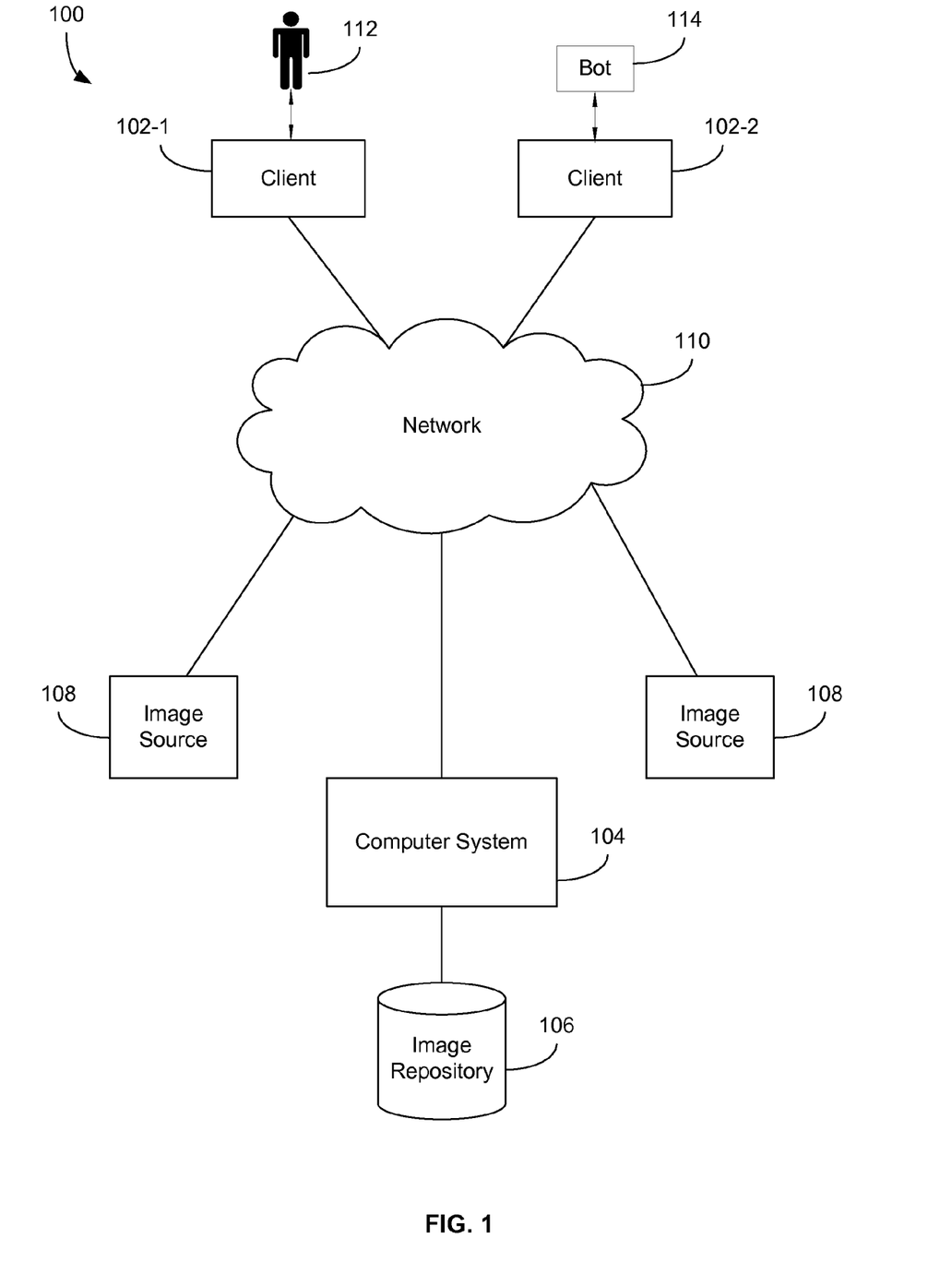
FIG. 1 is a block diagram illustrating a computer network in accordance with some embodiments.

FIG. 1 is a block diagram illustrating a computer network in accordance with some embodiments. The computer network 100 includes one or more clients 102, a computer system 104, one or more image sources 108, and a network 110 for interconnecting these components.

The network 110 may include, without limitation, a local area network (LAN), a metropolitan area network, a wide area network (WAN), such as an intranet, an extranet, wireless networks, or the Internet, or any combination of such networks. It is sufficient that the network 110 provides communication capability between a client 102 and the computer system 104. In some embodiments, the network 110 uses HyperText Transport Protocol (HTTP) to transport information using Transmission Control Protocol/Internet Protocol (TCP/IP). The HTTP permits a client 102 to access various resources available via the network 110. The various embodiments of the invention, however, are not limited to the use of any particular protocol.

The computer system 104 may provide services and access to resources to users of clients 102. The term "resource" as used throughout this specification refers to any document, object, information item, set of information, web-based application or service that is accessible via a Uniform Resource Locator (URL) and can be, for example, a web page, a text or word processing document, an email message, a voice message, a database, an image, or a computational object. Services may include email, message boards or forums, online surveys or polls, and weblogs (blogs). Some of these resources and services may require that the user open an account with the computer system 104 or the service. For example, accounts are often required for email and weblog services, so that the user's email messages and weblog posts may be associated with the user. In some embodiments, the interface to the services is a Web-based interface, using pages written in the Hypertext Markup Language (HTML) and perhaps other languages. The Web-based interface may be accessed via a client application such as a web browser. The computer system 104 may include one or more servers. The servers may perform a variety of functions, including provision of the services and managing user accounts and user access to the services.

The clients 102 are devices from which a user may access services on the computer system 104. The client 102 may be any device capable of communicating with other computers, devices, and so forth through the network 110. Examples of client devices may include, without limitation, desktop computers, notebook (or laptop) computers, personal digital assistants (PDAs), mobile phones, network terminals, and so forth. In some embodiments, the client device includes one or more applications for communicating with other computers or devices through the network 110. Examples of such applications include, without limitation, web browsers, email applications, and instant messaging or chat applications.

Each client 102 may be operated by a user. That is, the user may activate or deactivate programs or operations, including communications with the computer system 104, on the client 102. The user may be a human being 112 or automated computer program 114, such as an automated script or a bot. An automated computer program 114 acting as the user can access and use the same services that the human user 112 can access and use, but often at a faster rate. In some embodiments, a computer program 114 acting as the user may also run on other computers or devices connected to the network 110 and communicate with the computer system 104.

The computer system 104 may deploy a human interaction proof, to distinguish between a human 112 operating client 102-1 and an automated computer program 114 operating client 102-2. Some human interaction proofs involve presenting images from an image repository, such as image repository 106. The image repository 106 stores a plurality of images. Each image in the repository is associated with one or more keywords. The images may be obtained from one or more image sources 108. An image source 108 may be a computer that is accessible to the computer system 104 via the network 110. The image source 108 stores one or more images and provides access to them. In some embodiments, the image source 108 is a server associated with a website. Additional information regarding human interaction proofs is provided below.

As described above, the user attempting to access the computer system 104 may be a human 112 or an automated computer program 114. Because automated computer programs can access and utilize computer services at a faster rate than human beings, such programs are often deployed in order to abuse computer services. For example, bots may be deployed to automatically open email accounts and send many email messages, for example undesirable messages like spam. As another example, a bot may be deployed to access an online poll and engage in ballot stuffing.

In order to deter such abuse, human interaction proofs (HIPs) may be deployed. A human interaction proof is a class of techniques for verifying that the user is an actual human being rather than a computer program. A human interaction proof typically involves presenting a challenge to the user and requiring the user to provide a response to the challenge. If the user provides a correct response, the user is allowed access. If the user provides an incorrect response, the user is denied access. For human interaction proofs, the challenges are chosen to be relatively easy for humans to solve but difficult for automated computer programs. A well-known type of human interaction proof is a CAPTCHA (completely automated public Turing test to tell computers and humans apart). Information regarding use of human interaction proofs and CAPTCHAs is disclosed in U.S. Pat. No. 6,195,698, titled "Method for Selectively Restricting Access to Computer Systems;" and in Ahn et al., "Telling Humans and Computers Apart Automatically," *Communications of the ACM*, February 2004, pp. 57-60; the disclosures of which are hereby incorporated by reference in their entirety.

Another example of a human interaction proof (HIP) is PIX. PIX involves selecting an object, selecting from an image database a number of images of that object, and presenting the selected images to the user. A user that identifies the object correctly is approved for access to the computer system. The user may select the word identifying the object from a provided menu of words. An exemplary implementation of PIX is disclosed at http://gs264.sp.cs.cmu.edu/cgi-bin/esp-pix.

Figure 2A:
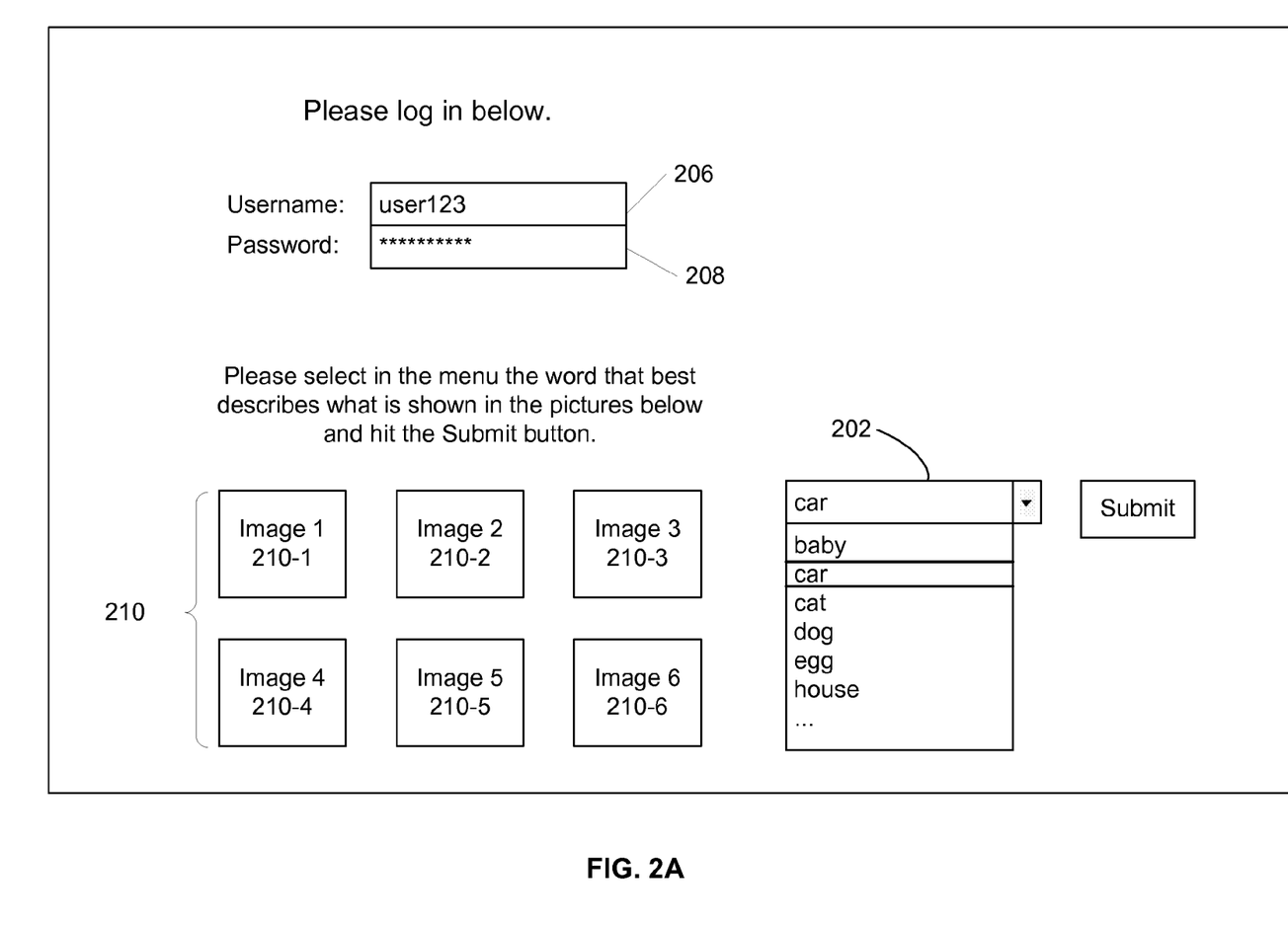
FIGS. 2A-2B illustrate exemplary user interfaces of a login prompt that includes a human interaction proof in accordance with some embodiments.
Figure 2B:
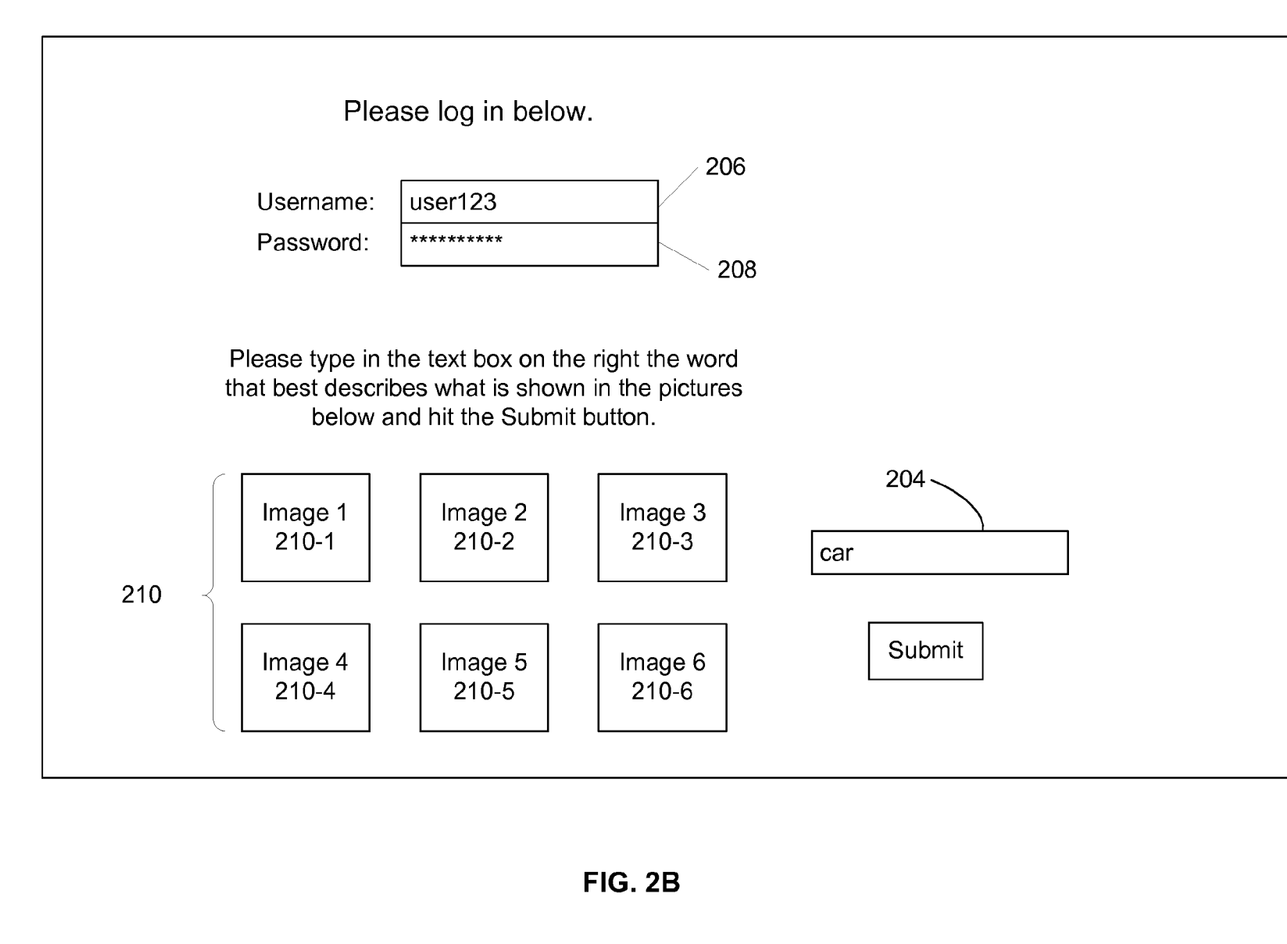

FIGS. 2A-2B illustrate exemplary user interfaces of a login prompt that includes a human interaction proof in accordance with some embodiments. FIG. 2A shows an exemplary login screen that also includes a human interaction proof. The login screen includes a text box for typing the username 206 and a text box for the password 208. The login screen also includes a human interaction proof presenting a plurality of images 210 preferably depicting a keyword. The HIP includes a prompt to select a word from a menu 202 that identifies the object in the plurality of images. Menu 202 includes a finite number N of semantically dissimilar words, as shown. Semantically dissimilar words are those that do not have similar meanings. For example, while the words "car" and "cat" are lexically similar (they are spelled the same except for the last letter) they have very different meanings It is highly unlikely that a human English speaker would think a car was the same thing as a cat.

The login is approved if the selected word correctly identifies the object shown in images 210. Otherwise, the login attempt is rejected. But even if a user does not recognize the images 210, the correct answer may be found by guessing from the menu 202. An automated computer program 114 may discriminate between the words in the menu 202 using feature analysis and pattern recognition algorithms on the images 210 based on the words in the menu. Automated computer programs could also be programmed to do an image search based on the words in the menu 202 and determine which of the words match the images 210.

FIG. 2B shows a preferable login screen that also includes a human interaction proof. Here, the login screen includes the same text boxes 206, 208 and plurality of images 210 as that shown in FIG. 1, but the user is asked to type the word identifying the object into a text box 204, as opposed to selecting the word from a menu 202. As with the HIP in FIG. 2A, the login is approved if the typed word correctly identifies the object in the images. Otherwise, the login attempt is rejected.

The input format shown in FIG. 2B increases the level of difficulty for the user by allowing an infinite number of inputs. For example, if the images 210 all show cars, a user might describe the object shown as "auto" instead of the keyword "car." In some embodiments, the HIP may accept synonyms as correctly identifying the object in images 210.

In some embodiments, the HIP may also accept words having the same stem as the keyword or predicted response. In the above example, the HIP might also accept "autos" and "cars." Similarly, the HIP may use a semantic clustering method to determine other related words that may be acceptable responses. For example, the HIP may use the clustering method described in U.S. patent application Ser. No. 10/676,571, filed Sep. 30, 2003, entitled "Method and Apparatus for Characterizing Documents Based on Clusters of Related Words" and incorporated by reference herein in its entirety. Other methods of determining semantically similar words may also be used to add to the set of acceptable answers.

In addition to using different words to describe the objects in the images 210, a human user 112 may misspell words entered into text box 204. For example, instead of type "auto" a human user 112 may accidentally type "augo." A human user 112 may also use unconventional spelling for a word, for example typing "dawg" instead of "dog." In some embodiments the HIP may use a spell checker or accept misspelled or unconventionally spelled words in addition to the keyword or predicted response.

In implementing a HIP based on displaying images of an object and identifying the object, it is important to be able to generate many sets of images quickly. Thus, a large image repository that may be quickly and efficiently queried to generate sets of images appropriate for use in HIPs is preferable.

Figure 3:
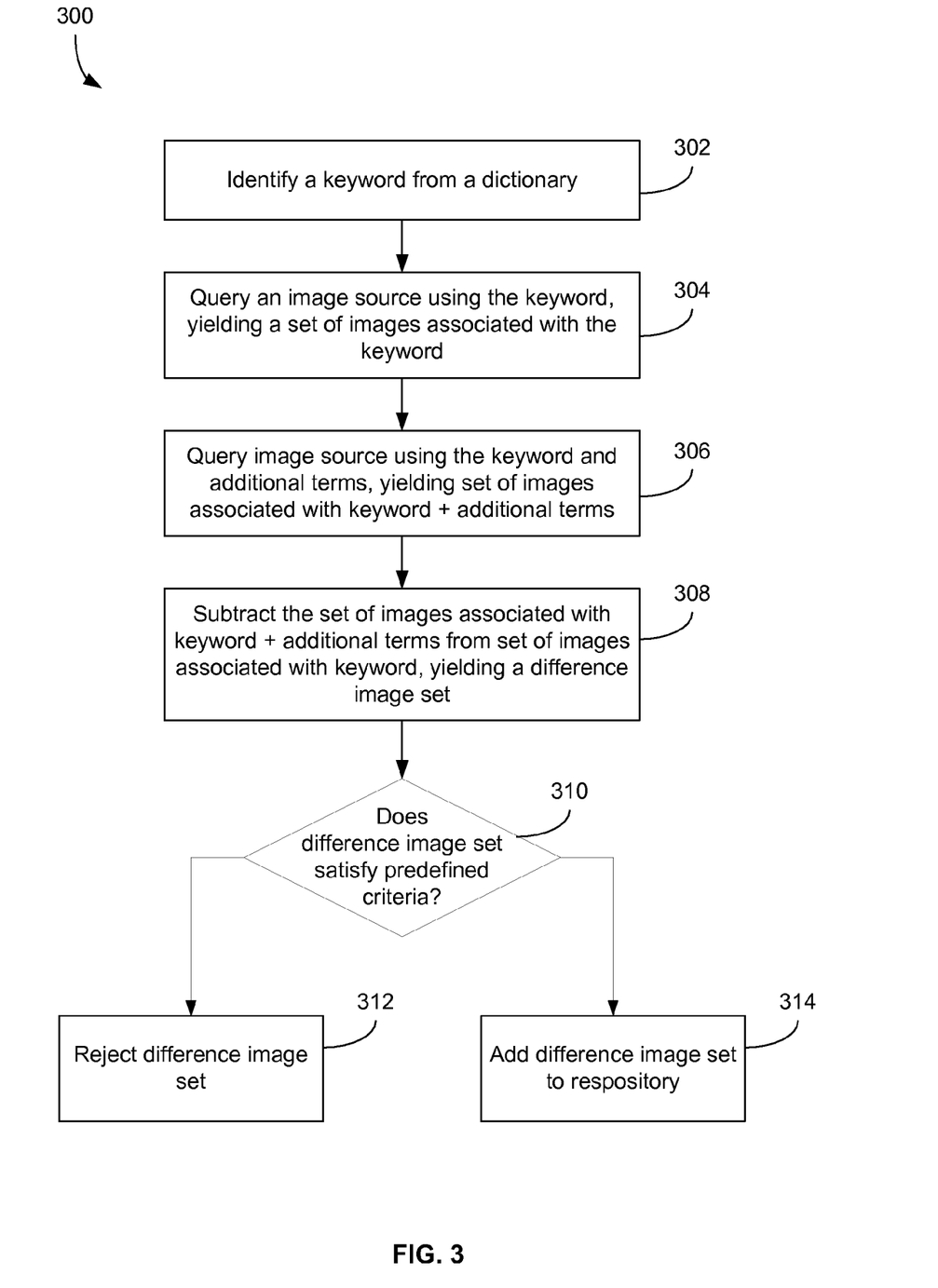
FIG. 3 is a flow diagram illustrating a process of adding images to an image repository in accordance with some embodiments.

FIG. 3 is a flow diagram illustrating a process of adding images to an image repository in accordance with some embodiments. Process flow 300 describes a process of adding to an image repository images associated with a keyword. The images may then be retrieved for use in HIPs such as the ones described above in relation to FIGS. 2A-2B.

A keyword is identified from a dictionary (302). As used herein, a dictionary is a list of words. A dictionary may include words that are drawn from one or more different sources, including newspapers, vocabulary lists, spelling lists, catalogs, children's books, common search terms received by a search engine, and the like. Because a HIP needs to be relatively easy for human users to solve, the words in the dictionary should be relatively simple words that are easily depicted by images. The choice of images to be presented to the users is guided by the words that are in the dictionary.

In some embodiments, a dictionary may be a list of commonly used nouns which are easily represented by images. In some embodiments, a dictionary may be a list of semantically dissimilar nouns. For example, in some embodiments the dictionary may contain nouns from a third grade vocabulary list. A word in the vocabulary list (or other word source) may be evaluated to determine whether it is a noun by consulting, for example grammatical reference book such as the "American Heritage Dictionary." In some embodiments, part-of-speech taggers, such the Brill Tagger, may be used to determine if a candidate word is a noun.

An image source is queried using the identified keyword (304). The image source may be an image database, an image search engine, or the like. For example, the images could be generated by using Google® image search, web-enabled photo albums, such as Flikr®, visual dictionaries, "image dictionaries," or the like. The result of the search is a set of images that are associated with the keyword. For example, a query on an image search engine using the keyword "horse" yields a plurality of images that are associated with the term "horse." The results may actually show images including one or more equine mammals, commonly known as horses, mention the term "horse" in a context associated with the images, show images of things related to equine mammals, such as a horse barn, or show images related to other definitions of the term "horse," such as a sea horse, gymnastic pommel horse, dark horse, or the like. In some embodiments, the results of the image search are filtered to remove sexually explicit content.

The image source is queried using the identified keyword and additional terms (306). This yields a set of images associated with the keyword and the additional terms. The additional terms may be related to other definitions of the keyword, synonyms, words conceptually related to the keywords, or the like. For example, a query on an image search engine using the keyword "horse" and the additional terms "gymnastic" and "pommel" yields a plurality of images associate with these terms, some of which may have been associated with only the keyword "horse" as well.

In some embodiments the additional terms may be identified from a "synonym dictionary," thesaurus, or the like. In some embodiments, the additional terms may be identified by performing a clustering analysis on results of a web search performed using the keyword to identify conceptually related words. For example, search results may be clustered according to the method of H-J. Zeng et al. described in "Learning to Cluster Web Search Results" in SIGIR '04, Jul. 25-29, 2004 and incorporated herein by reference. In some embodiments, the conceptually related words may be determined by a statistical analysis of search terms from multiple queries entered by users during a single session.

The set of images associated with the keyword and additional terms is subtracted from the set of images associated with the keyword (308). The result of the subtraction is a difference image set including only the images associated with the keyword that are not also associated with the keyword and additional terms. Using the above example, the difference image set would include images related to the keyword "horse" but not related to the terms "gymnastic" or "pommel."

Next a determination is made of whether the difference image set satisfies predefined criteria (310). The predefined criteria includes image count criteria may require that the difference image set includes at least as many images as will be presented to the user in the HIP. In some embodiments, the image count criteria require that the difference image set includes over a minimum threshold number of images, for example a threshold of 100 images. In preferred embodiments, the image count criteria require an image count of several thousand, for example 2,000, 10,000, or 100,000.

In some embodiments, the predefined criteria includes image coherence criteria, such as the Local Coherence selection method described in "Canonical Image Selection from the Web," by Y. Jing et al. in CIVR '07, Jul. 9-11, 2007 and incorporated herein by reference in its entirety. The image coherence criteria require the images in the difference image set to be sufficiently similar to each other, to a canonical image, or to a common visual theme. Similarity is measured using a similarity score, such as the number of matching features at interest points in the image divided by the total number of interest points.

If the difference image set does not meet the predefined criteria, the difference image set is rejected (312). If the difference image set meets the predefined criteria, the difference image set is added to the repository (314). This process 300 may be repeated for all of the keywords in the dictionary. In some embodiments, the process 300 is repeated until at least one difference image set is added to the repository. In some embodiments, the process 300 may be repeated periodically, for example daily, weekly, or the like. In some embodiments, the process 300 is repeated for some or all keywords in the dictionary each time the image source is updated.

Figure 4:
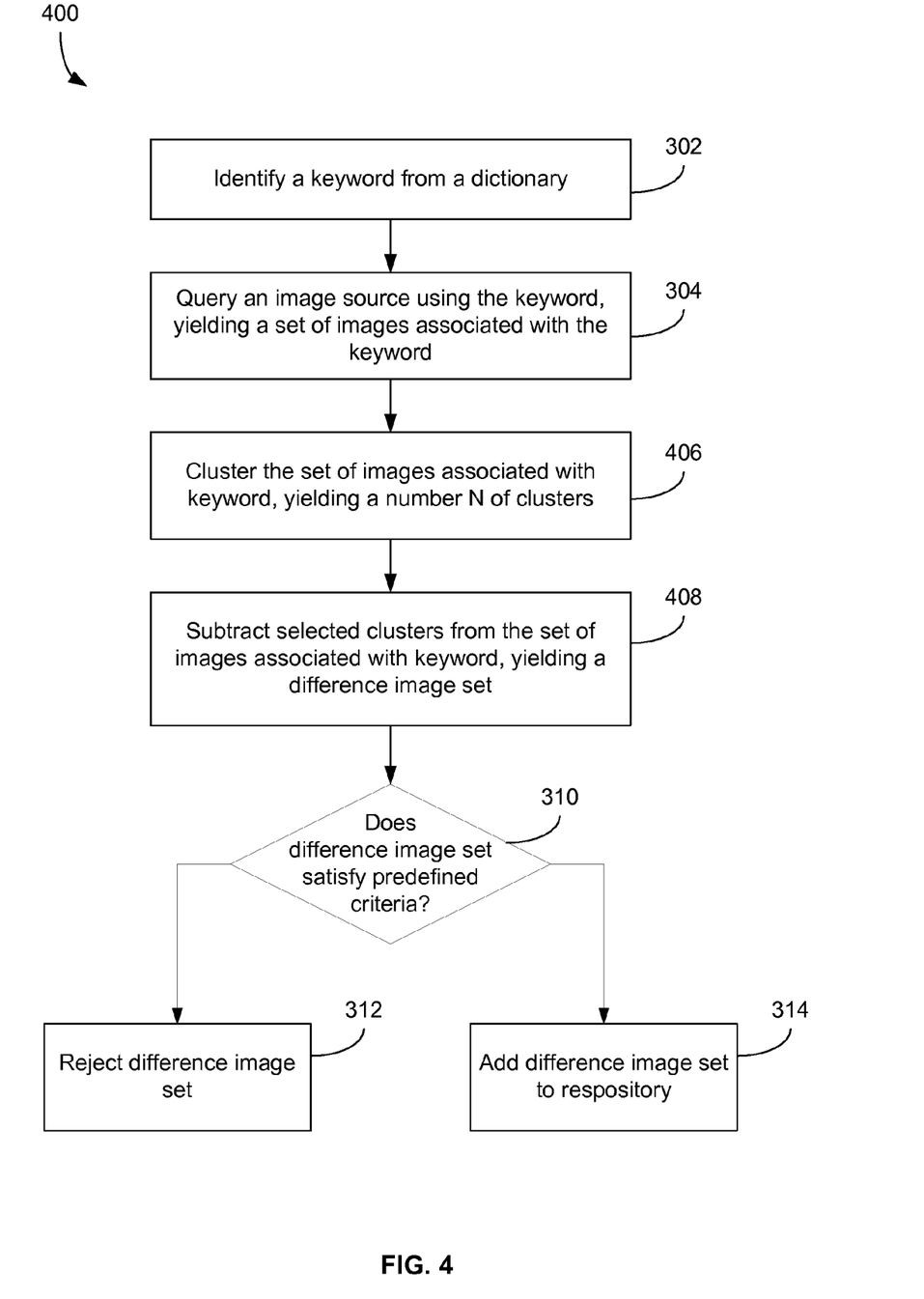
FIG. 4 is a flow diagram illustrating a process of adding images to an image repository in accordance with some embodiments.

FIG. 4 is a flow diagram illustrating a process of adding images to an image repository in accordance with some embodiments. Process flow 400 describes a process of adding to an image repository images associated with a keyword. The images may then be retrieved for use in HIPs such as the ones described above in relation to FIGS. 2A-2B.

A keyword is identified from a dictionary (302). An image source is queried using the identified keyword (304). The result of the search is a set of images that are associated with the keyword. The set of images are clustered using an image clustering algorithm. (406) The image clustering algorithm may be, for example, an image clustering algorithm discussed in "Image Clustering using Semantic Tolerance Relation Model" by Y. Dai and D. Cai in Proceeding (558) Internet and Multimedia Systems and Applications—2007 (incorporated herein by reference), "Unsupervised Image Clustering using the Information Bottleneck Method" by J. Goldberger et al. pages 158-165 in Pattern Recognition: 24th DAGM Symposium, Zurich, Switzerland, Sep. 16-18, 2002. Proceedings (incorporated herein by reference), or similar algorithms. The clustering operation 406 yields a number N of clusters associated with the keyword. In some embodiments, the N clusters may be further categorized by the degree to which they are related to the keyword. In some embodiments, the N clusters may be further categorized by the degree to which they overlap.

Clusters are subtracted from the set of images associated with the keyword (408). The result of the subtraction is a difference image set. The difference image set may include only the images most closely related to the keyword, the biggest clusters, the most overlapping clusters or the like. The difference image set may be a single cluster or multiple clusters. Next a determination is made of whether the difference image set satisfies predefined criteria (310). If the difference image set does not meet the predefined criteria, the difference image set is rejected (312). If the difference image set meets the predefined criteria, the difference image set is added to the repository (314). This process 400 may be repeated for all of the keywords in the dictionary. In some embodiments, the process 400 is repeated until at least one difference image set is added to the repository. In some embodiments, the process 400 may be repeated periodically, for example daily, weekly, or the like. In some embodiments, the process 400 is repeated for some or all keywords in the dictionary each time the image source is updated. In some embodiments the process 300 and the process 400 are used to populate the image set repository.

Figure 5:
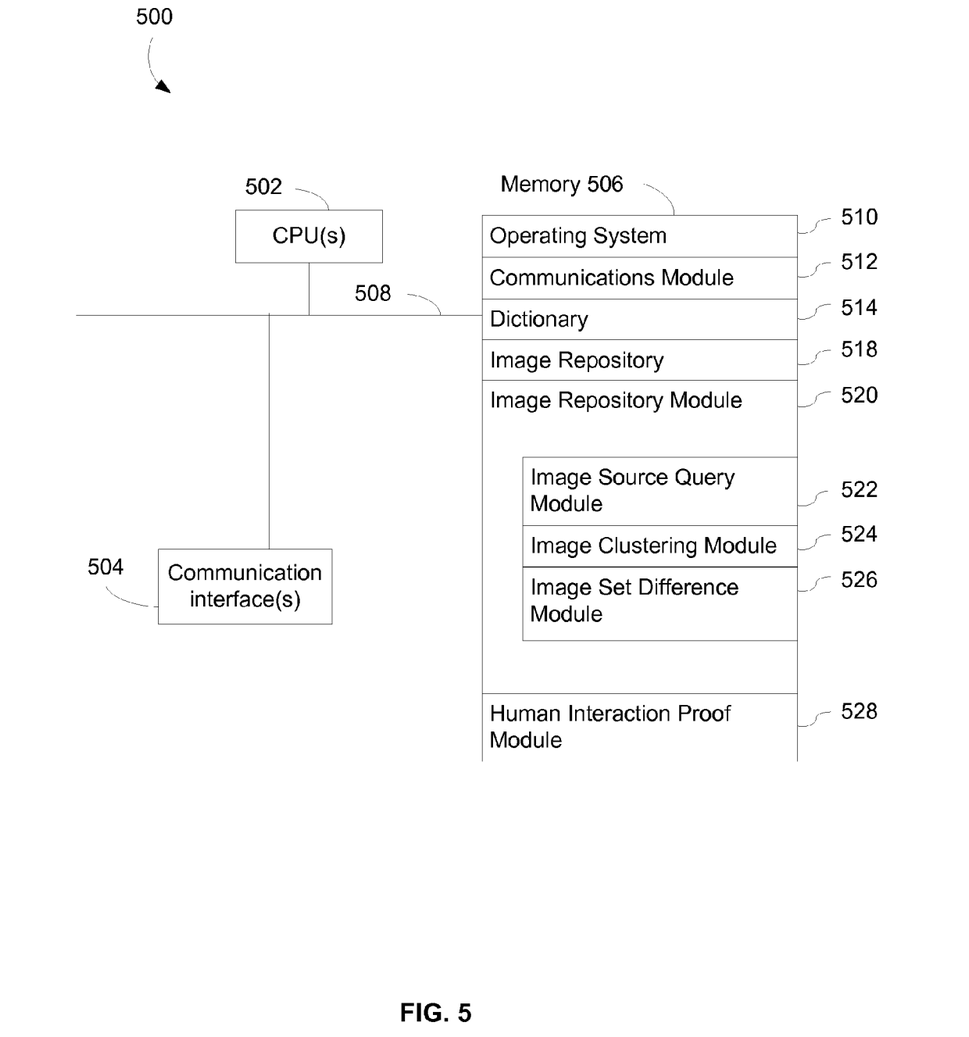
FIG. 5 is a block diagram of a computer system having an image repository and a human interaction proof module in accordance with some embodiments.

FIG. 5 is a block diagram illustrating a computer system 500 in accordance with some embodiments. The computer system 500 typically includes one or more processing units (CPU's) 502, one or more network or other communications interfaces 504, memory 506, and one or more communication buses 508 for interconnecting these components. The computer system 500 optionally may include a user interface with a display device and a keyboard (not shown). Memory 506 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 506 may optionally include one or more storage devices remotely located from the CPU(s) 502. Memory 506, or one or more of the storage devices (e.g., one or more non-volatile storage devices) in memory 506, includes a computer readable storage medium. In some embodiments, memory 506 or the computer readable storage medium of memory 506 stores the following programs, modules and data structures, or a subset thereof:

- an operating system 510 that includes procedures for handling various basic system services and for performing hardware dependent tasks;
- a network communication module 512 that is used for connecting the computer system 500 to other computers via the one or more communication network interfaces 504 (wired or wireless), such as the Internet, other wide area networks, local area networks, metropolitan area networks, and so on;
- a dictionary 514 of words that represent potential answers to a human interaction proof generated by the computer system 500;
- an image repository 518 for storing images that may be used in human interaction proofs;
- an image repository module 520 for populating the image repository 518; and
- a human interaction proof module 528 for generating and administering human interaction proofs.

The image repository module 520 may include the following sub-modules, or a subset thereof:

- an image source query module 522 for searching image sources for candidate images to include in the repository;
- an image clustering module 524 for clustering image query results; and
- an image set difference module 526 for subtracting one image set from another.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 506 may store a subset of the modules and data structures identified above. Furthermore, memory 506 may store additional modules and data structures not described above.

Although FIG. 5 shows a "computer system," FIG. 5 is intended more as functional description of the various features which may be present in a set of servers than as a structural schematic of the embodiments described herein. In practice, and as recognized by those of ordinary skill in the art, items shown separately could be combined and some items could be separated. For example, some items shown separately in FIG. 5 could be implemented on single servers and single items could be implemented by one or more servers. The actual number of servers used to implement a computer system and how features are allocated among them will vary from one implementation to another, and may depend in part on the amount of data traffic that the system must handle during peak usage periods as well as during average usage periods.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method of populating an image repository, comprising:
   at a computer system having one or more processors and memory storing one or more programs for execution by the one or more processors to perform the method,
   identifying a keyword from a dictionary;
   querying an image source using the keyword to obtain a set of images associated with the keyword;
   obtaining a plurality of images associated with a combination of the keyword and one or more additional terms by performing a second query on the image source using the combination;
   subtracting the plurality of images associated with the combination from the set of images associated with the keyword to generate a difference set of images;
   adding the difference set of images to the image repository if the difference set of images satisfies predefined criteria; and
   retrieving one or more images from the image repository for use as human interaction proofs.

2. The method of claim 1, wherein identifying the keyword includes analyzing a candidate word using a part-of-speech tagger.

3. The method of claim 1, wherein the keyword is a noun.

4. The method of claim 1, wherein the additional terms comprise terms associated with synonyms of the keyword.

5. The method of claim 1, wherein the additional terms comprise terms associated with alternate definitions of the keyword.

6. The method of claim 1, wherein the additional terms comprise terms conceptually related to the keyword.

7. The method of claim 1, including:
   submitting the keyword as a query to an Internet search engine;
   clustering search results of the query; and
   determining the additional terms based on the clustering.

8. The method of claim 1, wherein the dictionary comprises words drawn from at least one of the group consisting of logs of search engine queries, electronic messages, children's books, vocabulary lists, newspapers, spelling lists, and catalogs.

9. The method of claim 1, wherein the dictionary comprises semantically dissimilar words.

10. The method of claim 1, wherein the dictionary comprises words and the identifying, querying, obtaining, subtracting, and adding are repeated for all words in the dictionary.

11. The method of claim 1, wherein the dictionary comprises words and the identifying, querying, obtaining, subtracting, and adding are repeated periodically for all words in the dictionary.

12. The method of claim 1, wherein the identifying, querying, obtaining, subtracting, and adding are repeated.

13. The method of claim 1, wherein the image sources comprises at least one of the group consisting of an image database and an Internet.

14. The method of claim 1, wherein the predefined criteria includes that a number of images in the difference set is at least a predefined number of images.

15. The method of claim 1, wherein the difference set of images comprises a subset of the set of images associated with the keyword, excluding the plurality of images associated with the combination.

16. A system, comprising:
   memory;
   one or more processors; and
   one or more modules stored in the memory and configured for execution by the one or more processors, the modules comprising:
   instructions to identify a keyword from a dictionary;
   instructions to perform a first query on an image source using the keyword to obtain a set of images associated with the keyword;
   instructions to obtain a plurality of images associated with a combination of the keyword and one or more additional terms by performing a second query on the image source using the combination;
   instructions to subtract the plurality of images associated with the combination from the set of images associated with the keyword to generate a difference set of images;
   instructions to add the difference set of images to an image repository if the difference set of images satisfies predefined criteria; and
   instructions to retrieve one or more images from the image repository for use as human interaction proofs.

17. A computer readable storage medium storing one or more computer programs, the one or more computer programs configured to, when executed by a computer system having one or more processors, cause the computer system to perform actions comprising:
   identifying a keyword from a dictionary;
   performing a first query on an image source using the keyword to obtain a set of images associated with the keyword;
   performing a second query on the image source using a combination of the keyword and one or more additional terms to obtain a plurality of images associated with the combination;
   subtracting the plurality of images associated with the combination from the set of images associated with the keyword to generate a difference set of images;
   adding the difference set of images to an image repository if the difference set of images satisfies predefined criteria; and
   retrieving one or more images from the image repository for use as human interaction proofs.

18. A system, comprising:
   means for identifying a keyword from a dictionary;
   means for performing a first query on an image source using the keyword to obtain a set of images associated with the keyword;
   means for performing a second query on the image source using a combination of the keyword and one or more additional terms to obtain a plurality of images associated with the combination;
   means for subtracting the plurality of images associated with the combination from the set of images associated with the keyword to generate a difference set of images;
   means for adding the difference set of images to an image repository if the difference set of images satisfies predefined criteria; and
   means for retrieving one or more images from the image repository for use as human interaction proofs.

19. A method of populating an image repository, comprising:
- at a computer system having one or more processors and memory storing one or more programs for execution by the one or more processors to perform the method,
- identifying a keyword from a dictionary;
- querying an image source using the keyword to obtain a set of images associated with the keyword;
- generating a plurality of clusters of images associated with the keyword by clustering the set of images associated with the keyword;
- subtracting a selected subset of the plurality of clusters from the set of images associated with the keyword to generate a difference set of images;
- adding the difference set of images to the image repository if the difference set of images satisfies predefined criteria; and
- retrieving one or more images from the image repository for use as human interaction proofs.

20. A system, comprising:
- means for identifying a keyword from a dictionary;
- means for querying an image source using the keyword to obtain a set of images associated with the keyword;
- means for generating a plurality of clusters of images associated with the keyword by clustering the set of images associated with the keyword;
- means for subtracting a selected subset of the plurality of clusters from the set of images associated with the keyword to generate a difference set of images;
- means for adding the difference set of images to an image repository if the difference set of images satisfies predefined criteria; and
- means for retrieving one or more images from the image repository for use as human interaction proofs.

21. A computer readable storage medium storing one or more computer programs, the one or more computer programs configured to, when executed by a computer system having one or more processors, cause the computer system to perform actions comprising:
- identifying a keyword from a dictionary;
- querying an image source using the keyword to obtain a set of images associated with the keyword;
- generating a plurality of clusters of images associated with the keyword by clustering the set of images associated with the keyword;
- subtracting a selected subset of the plurality of clusters from the set of images associated with the keyword to generate a difference set of images;
- adding the difference set of images to an image repository if the difference set of images satisfies predefined criteria; and
- retrieving one or more images from the image repository for use as human interaction proofs.

22. A system, comprising:
memory;
one or more processors; and
one or more modules stored in the memory and configured for execution by the one or more processors, the modules comprising:
- instructions for identifying a keyword from a dictionary;
- instructions for querying an image source using the keyword to obtain a set of images associated with the keyword;
- instructions for generating a plurality of clusters of images associated with the keyword by clustering the set of images associated with the keyword;
- instructions for subtracting a selected subset of the plurality of clusters from the set of images associated with the keyword to generate a difference set of images;
- instructions for adding the difference set of images to an image repository if the difference set of images satisfies predefined criteria; and
- instructions for retrieving one or more images from the image repository for use as human interaction proofs.

* * * * *